(No Model.)
R. C. SHEELEY.
CANNING OR PRESERVING JAR.
No. 476,690. Patented June 7, 1892.
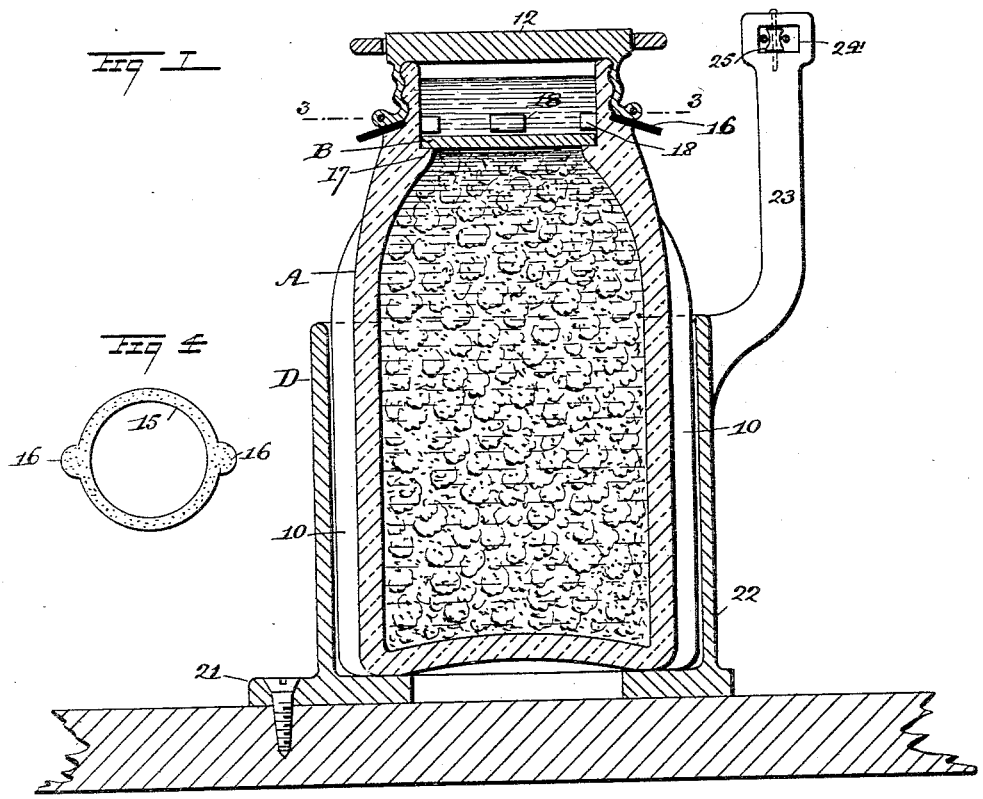
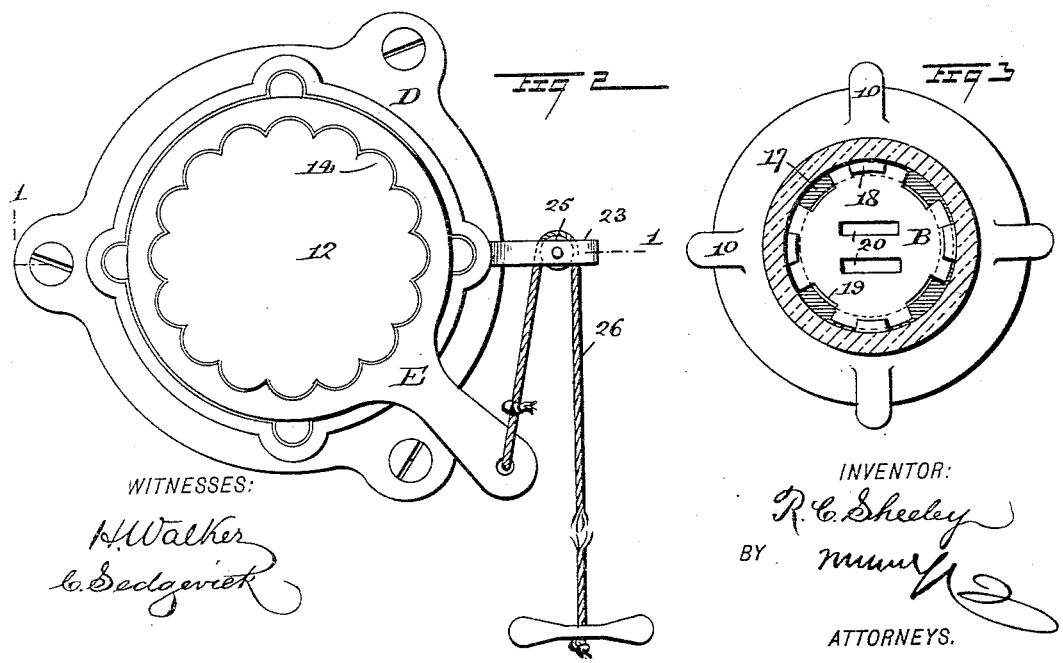
WITNESSES:
H. Walker
C. Sedgwick
INVENTOR:
R. C. Sheeley
BY
ATTORNEYS.

UNITED STATES PATENT OFFICE.

REBECCA CONKLING SHEELEY, OF LYONS, KANSAS.

CANNING OR PRESERVING JAR.

SPECIFICATION forming part of Letters Patent No. 476,690, dated June 7, 1892.

Application filed January 26, 1892. Serial No. 419,292. (No model.)

*To all whom it may concern:*

Be it known that I, REBECCA CONKLING SHEELEY, of Lyons, in the county of Rice and State of Kansas, have invented a new and useful Improvement in Canning or Preserving Jars, of which the following is a full, clear, and exact description.

My invention relates to an improvement in canning and preserving jars, and has for its object to provide a means whereby the jar may be held from turning when the cover is to be applied thereto or removed therefrom.

A further object of the invention is to provide a novel means for removing the cover or tightening it upon the body of the jar, and to so construct the washer intervening the cover and the jar that the washer may be removed to admit air into the jar and thus facilitate the opening thereof.

It is also an object of the invention to use in connection with the jar a follower adapted to maintain the contents of the jar below the level of the liquid in said jar.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 1 is a central vertical section through the jar and through the socket adapted to receive it, the said section being taken practically on the line 1 1 of Fig. 2. Fig. 2 is a plan view of the jar and the socket receiving it. Fig. 3 is a horizontal section taken on the line 3 3 of Fig. 1, and Fig. 4 is a plan view of the washer.

The jar A has produced upon its outer surface a series of vertical ribs 10. Any desired number of these ribs may be employed, and preferably they commence at the neck and terminate at the bottom of the jar, as is best shown in Fig. 1. The neck of the jar is provided with an exterior thread, upon which the cover 12 is screwed. The cover has at its lower edge a strengthening-wire, which causes it to bear firmly and with a spring action against a washer 15, and the cover is pressed or otherwise manipulated to produce exteriorly thereon corrugations or fluted or scalloped surfaces 14, for a purpose to be hereinafter described. This form of cover is preferred; but the jar may be provided with any other cover that may be found practical or convenient for use. The washer 15 may be of rubber, leather, or an equivalent material, and is shaped like an ordinary washer, except that at opposite sides ears 16 are produced, and the ears extend beyond the cover, so that they may be readily grasped. When the jar is to be opened, by grasping one of the ears the washer may be drawn a sufficient distance from beneath the cover to admit air, thereby facilitating the task of removing the cover. The interior of the jar at the lower portion of its neck is provided with an annular flange 17, as is best shown in Figs. 1 and 3, and above the flange at intervals apart a series of lugs 18 is circumferentially arranged.

In connection with a jar a presser-plate B is preferably employed. This plate is made of a diameter to neatly fit in the neck of the jar, and is provided with a series of marginal recesses 19, which when brought in registry with the lugs 18 in the neck of the jar enables the presser-plate to pass the lugs and rest upon the interior annular flange 17, as shown in Figs. 1 and 2. The plate is prevented from leaving the flange by turning it around in such a manner as to bring the uncut portion of its periphery beneath the lugs 18, and to that end the presser-plate is provided with openings 20 at or near its center, into which the fingers may be introduced, or any object adapted for lifting the plate upward or for turning it around, as desired. This plate serves the purpose of pressing the fruit or other contents of the jar downward below the neck and beneath the surface of the liquid or sirup in which the fruit is preserved, and the said presser-plate, while in use, will at all times maintain the fruit in that position.

In connection with jars of the type described, a socket D is employed. This socket consists of a base 21, adapted to be attached to a table or other support, and a body portion 22, shaped in such a manner as to receive and snugly embrace the body of a jar. To that end the body of the socket is provided with interior channels to receive the ribs 10, and the interior diameter of the socket corresponds practically to the exterior diameter of the jar. For attaching the socket to a support, lugs are ordinarily formed integral with the base and provided with apertures whereby screws may be employed as the attaching medium. From one side of the socket an arm 23 is projected vertically upward and provided at its upper end with an opening 24, in which a friction-roller 25 is journaled. In connection with the top of the jar a wrench E is used to screw a cap or cover in place or to remove it from a jar. This wrench comprises a handle and a body portion of ring-like contour, provided with recesses to receive the lugs 14 of the cap or cover, the body of the wrench when applied resting upon the cover, as is shown in Fig. 2. It will be observed that when a jar is placed in the socket it cannot turn therein, and that when the wrench is applied to the cover it may be manipulated conveniently and expeditiously either to remove the cover from the jar or to fasten it securely thereon.

To facilitate locking and unlocking the cover, a cord 26 is attached to the handle of the wrench, the free end of the wrench having usually attached thereto a handle, and is passed over the friction-roller 25 of the arm 23 away from the wrench, and then is returned in direction thereof. It is evident that when tension is exerted upon the cord 26 the wrench will be drawn around in a direction the reverse of that in which the tension is applied, and that the cord will permit the operation of unfastening and fastening the cover to be as readily accomplished by a weak as by a strong person, and, further, that the awkward method of unscrewing the cover—namely, turning it backward with the right hand or else operating with the left hand—is avoided.

Having thus described my invention, I claim as new and desire to secure by Letters Patent—

1. The jar-holding socket 22, open at its upper end to receive a jar and hold it against rotation and provided with an upward-extending arm 23, having a pulley at its upper end, in combination with a wrench to engage the jar-cover and having a handle and an operating-cord extending from the handle around the pulley, substantially as shown and described.

2. The combination, with a fruit or preserving jar provided with a series of exterior ribs, of a socket open at its upper end to receive the jar and prevent it from rotating, the interior contour of which socket practically corresponds to the exterior contour of the jar, as and for the purpose set forth.

3. The combination, with a fruit or preserving jar and the cover thereof, the body of the jar being provided with a series of exterior ribs and its cover with a series of outwardly-extending projections, of a socket open at its upper end to receive the body of the jar, the interior of the socket being shaped to clamp the exterior of the jar and prevent it from turning, an arm projecting upward from the socket having an opening therein, and a friction device contained within the opening, a wrench adapted to fit over the cap or cover and receive the projections thereof, said wrench being provided with a handle, and a cord attached to the handle and passed through the opening in the arm of the socket and in engagement with its friction device, as and for the purpose specified.

REBECCA CONKLING SHEELEY.

Witnesses:
E. D. CONKLING,
H. P. CONKLING.